(12) United States Patent
Koh et al.

(10) Patent No.: US 9,324,975 B2
(45) Date of Patent: Apr. 26, 2016

(54) CARD BATTERY HAVING SMART CARD FUNCTIONS

(75) Inventors: Seok Koh, Suwon-si (KR); Bongyoung Kim, Suwon-si (KR); Kyungho Park, Suwon-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 1157 days.

(21) Appl. No.: 12/628,897

(22) Filed: Dec. 1, 2009

(65) Prior Publication Data

US 2010/0136416 A1 Jun. 3, 2010

(30) Foreign Application Priority Data

Dec. 2, 2008 (KR) .................. 10-2008-0120928

(51) Int. Cl.
| | | |
|---|---|---|
| *H01M 6/12* | (2006.01) | |
| *H01M 2/02* | (2006.01) | |
| *H01M 2/10* | (2006.01) | |
| *H01M 2/34* | (2006.01) | |
| *H01M 10/04* | (2006.01) | |
| *H01M 10/42* | (2006.01) | |
| *H01M 10/46* | (2006.01) | |

(52) U.S. Cl.
CPC .......... *H01M 2/0207* (2013.01); *H01M 2/1061* (2013.01); *H01M 2/34* (2013.01); *H01M 10/0436* (2013.01); *H01M 10/4257* (2013.01); *H01M 10/46* (2013.01); *H01M 2002/0205* (2013.01); *H01M 2200/00* (2013.01)

(58) Field of Classification Search
CPC .......... H01L 2924/10253; H01L 2224/73265; H01L 2224/32225; H01L 2924/19041; H01L 23/576; H01L 2924/14; H01L 2924/15165; H01L 2924/15174; H01M 10/4257; H01M 10/052; H01M 2/1066; H01M 10/0436
See application file for complete search history.

(56) References Cited

U.S. PATENT DOCUMENTS

| | | | |
|---|---|---|---|
| 6,492,058 B1 * | 12/2002 | Watanabe et al. ............. | 429/121 |
| 7,528,573 B2 * | 5/2009 | Hong et al. .................... | 320/112 |
| 2003/0175560 A1 * | 9/2003 | Kim et al. ......................... | 429/7 |
| 2003/0224223 A1 * | 12/2003 | Edwards ........................... | 429/7 |
| 2005/0194453 A1 * | 9/2005 | Conner et al. ................ | 235/492 |
| 2005/0197169 A1 * | 9/2005 | Son ................................ | 455/572 |
| 2006/0051678 A1 * | 3/2006 | Kim et al. ..................... | 429/246 |
| 2006/0076923 A1 * | 4/2006 | Eaves ............................. | 320/112 |
| 2006/0147792 A1 * | 7/2006 | Nelson et al. ................... | 429/65 |
| 2009/0121020 A1 * | 5/2009 | Gallagher et al. ............ | 235/438 |
| 2009/0286150 A1 | 11/2009 | Nelson et al. | |

FOREIGN PATENT DOCUMENTS

KR 10-20070035877 4/2007
(Continued)

OTHER PUBLICATIONS

Office Action dated Aug. 26, 2011 for corresponding KR Application No. 10-2008-0120928.

*Primary Examiner* — Yelena G Gakh
(74) *Attorney, Agent, or Firm* — Knobbe, Martens, Olson & Bear, LLP

(57) ABSTRACT

Disclosed is a card type battery that has both functions of a smart card and a battery. The card battery can prevent a short caused by contact with an external device, reduce a total thickness of the battery and improve bonding strength between internal elements of the battery.

14 Claims, 5 Drawing Sheets

(56) References Cited

FOREIGN PATENT DOCUMENTS

| KR | 1020070038148 | 4/2007 |
| KR | 10 20080036739 | 4/2008 |
| KR | 10-20080039093 | 5/2008 |
| KR | 10 20080069376 | 7/2008 |

* cited by examiner

CARD BATTERY HAVING SMART CARD FUNCTIONS

CLAIM FOR PRIORITY

This application is based on and claims priority to Korean Patent Application No. 10-2008-0120928 filed on Dec. 2, 2008 in the Korean Intellectual Property Office (KIPO), the entire contents of which are hereby incorporated by reference.

BACKGROUND

1. Field

The present invention relates to a battery, and more particularly, to a card type battery that has both functions of a smart card and a battery.

2. Description of the Related Art

Generally, a smart card has been indispensably and widely used to store, retrieve and process information in the fields of finance, transaction, traffic, ID card and security. The smart card is usually made in a size that can be put in a wallet.

In addition, a rechargeable battery is used in most of electronic devices. A user often carries a spare rechargeable battery when the user carries many portable devices. Therefore, in order to reduce volume and weight of the battery, lightweight and small-sized rechargeable batteries have been developed.

In the card type battery having both functions of battery and smart card that are indispensable in present-day life, the card type battery should have a small size and stability for practical use thereof.

SUMMARY

An object of the present invention is to provide a card battery that can function as both of a smart card and a battery.

Another object of the present invention is to provide a card battery that can prevent a charging/discharging terminal from being shorted due to contact with an external device.

A still another object of the present invention is to provide a card battery that can reduce a size thereof by reducing a thickness of an outer cover.

A further still another object of the present invention is to provide a card battery that can prevent bonding strength between internal elements from being weakened when the battery is bent.

Additional advantages, objects and features of the invention will be set forth in part in the description which follows and in part will become apparent to those having ordinary skill in the art upon examination of the following or may be learned from practice of the invention.

According to one aspect of the present invention, there is provided a card battery, which comprises: a bare cell including first and second electrode plates and a separator; a protection circuit module electrically coupled to the bare cell; a frame receiving the bare cell and protection circuit module; a first cover provided on the frame; and a second cover provided under the frame, where the protection circuit module includes a substrate, a protection circuit unit provided on the substrate and a charging/discharging terminal that is provided on the substrate and electrically coupled to the protection circuit unit, and an upper surface of the charging/discharging terminal may be lower than an upper surface of the first cover.

According to another aspect of the present invention, there is provided a card battery having a smart card function, which comprises: a bare cell including first and second electrode plates and a separator; a protection circuit module electrically coupled to the bare cell; a frame receiving the bare cell and protection circuit module; a first cover, provided on the frame, being made of metal; and a second cover, provided under the frame, being made of metal, where a magnetic groove may be formed on an outer surface of the first or second cover in a direction of a long edge of the cover.

According to a still another aspect of the present invention, there is provided a card battery, which comprises: a bare cell including first and second electrode plates and a separator; a protection circuit module electrically coupled to the bare cell; a frame receiving the bare cell and protection circuit module; a first cover provided on the frame; a second cover provided under the frame; and a first thermal bonding layer provided between an edge of an inner surface of the first cover and an edge of a first surface of the frame.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Figure 1:
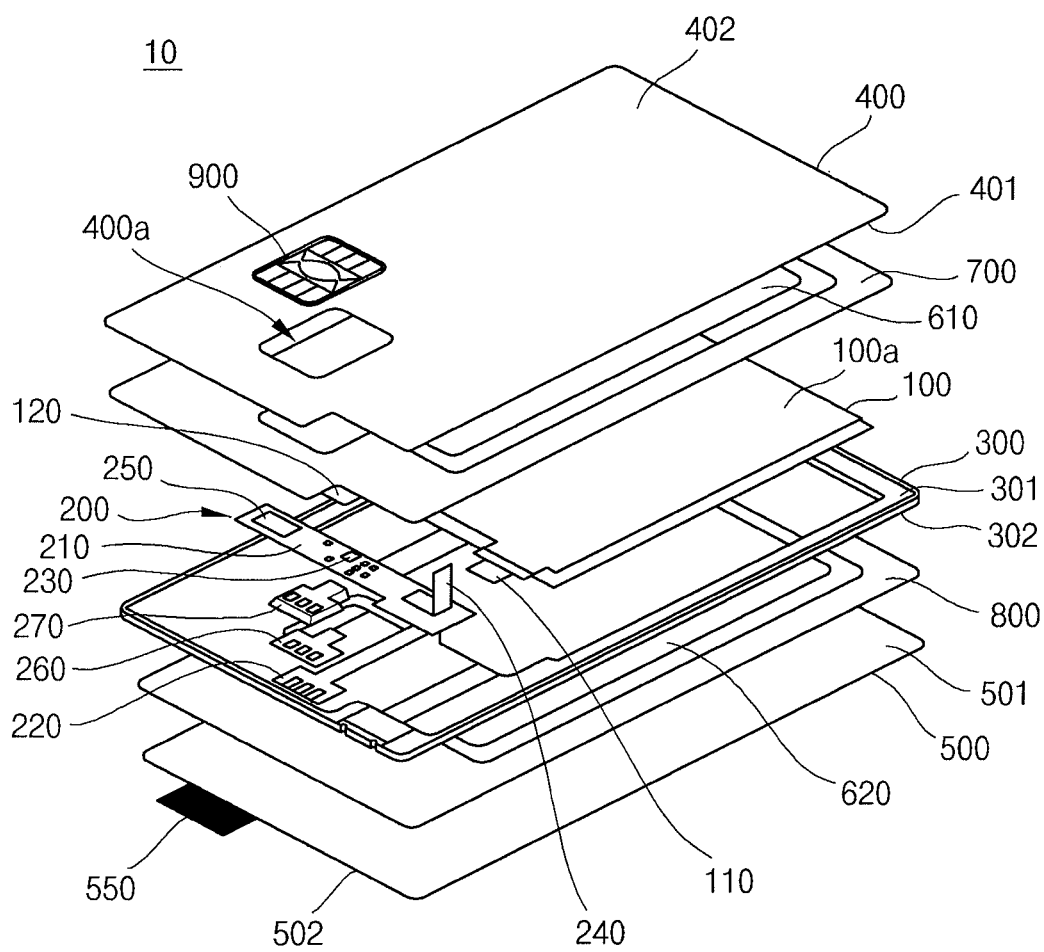
FIG. 1 is an exploded perspective view illustrating a card battery according to one exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
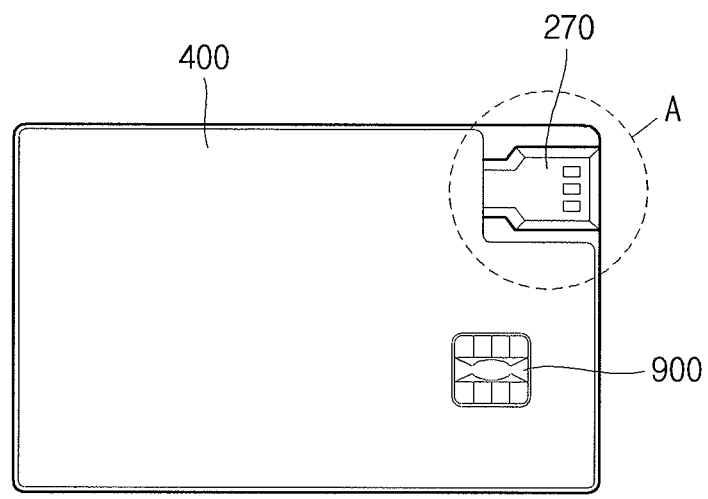
FIG. 2 is a front view illustrating the card battery.
Figure 3:
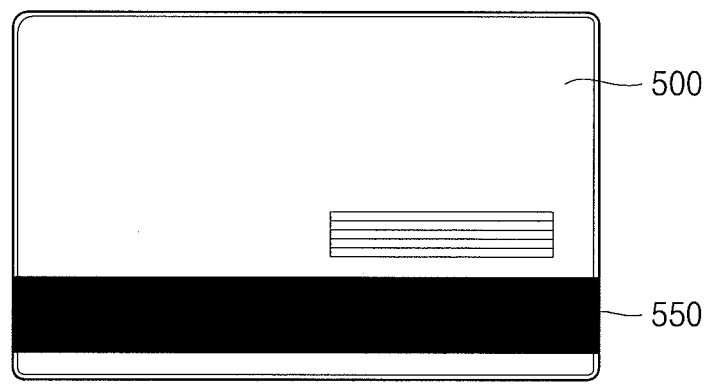
FIG. 3 is a rear view illustrating the card battery.

FIG. 1 is an exploded perspective view illustrating a card battery 10 according to one exemplary embodiment of the present invention and FIGS. 2 and 3 are respectively front and rear views illustrating the card battery 10.

Referring to FIGS. 1 to 3, the card battery 10 includes a bare cell 100, a protection circuit module 200, a frame 300, a first cover 400, a second cover 500 and an IC chip 900. In addition, the card battery 10 may further include double-coated adhesive layers 610 and 620 and thermal bonding layers 700 and 800.

The bare cell 100 includes an electrode assembly (not shown) and a pouch 100a surrounding the electrode assembly. The electrode assembly includes a first electrode plate (not shown), a second electrode plate (not shown) and a separator (not shown). The electrode assembly is formed by interposing the separator between the first and second electrode plates and winding them together in a jelly-roll type. The protection circuit module 200 is provided on the bare cell 100 in the direction of first and second electrode tabs 110 and 120. The protection circuit module 200 is formed by electrically coupling a protection circuit unit 230 to a charging/discharging terminal 220 on a substrate 210 through a conductive metal pattern. The protection circuit module 200 includes first and second lead plates 240 and 250 that are electrically coupled to the first and second electrode tabs 110 and 120 respectively. The substrate 210 is formed of a flexible printed circuit board (FPCB). A thickness of the substrate 210 is about 0.1 mm. Therefore, a thickness of the bare cell 100 can be significantly reduced. The charging/discharging terminal 220 may be provided at a short edge of the bare cell 100, but may be provided at a long edge of the bare cell 100 according to a structure of the substrate 210. In the embodiment, there will be explained a case where the charging/discharging terminal 220 is provided at the short edge of the card battery 10. An 'A' region including the charging/discharging terminal 220 may be referred as a terminal part. The terminal part will be explained in detail later.

The bare cell 100 and protection circuit module 200 are seated on the frame 300. The frame 300 is a framework of a structure of the bare cell 100 and keeps appearance of the bare cell 100. The frame 300 has a rectangular shape and includes a groove in the middle thereof to receive the bare cell 100 and protection circuit module 200. The frame 300 includes a first surface 301 and a second surface 302 opposite to the first surface 301, where the charging/discharging terminal 220 is provided on the first surface 301.

First and second covers 400 and 500 are respectively provided on/under the frame 300. The first and second covers 400 and 500 are made of metal, desirably, stainless steel. The first cover 400 includes an inner surface 401 facing the bare cell 100 and an outer surface 402 opposite to the inner surface 401. The second cover 500 includes an inner surface 501 facing the bare cell 100 and an outer surface 502 opposite to the inner surface 501.

The first cover 400 and bare cell 100 may be bonded and combined with together by the double-coated layer 610 interposed between the inner surface 401 of the first cover 400 and bare cell 100. In addition, the second cover 500 and bare cell 100 may be combined with together by the double-coated adhesive layer 620 interposed between the inner surface 501 of the second cover 500 and bare cell 100.

In this time, the first thermal bonding layer 700 may be interposed between an edge of the first surface 301 of the frame 300 and an edge of the inner surface 401 of the first cover 400. In addition, the second thermal bonding layer 800 may be interposed between an edge of the second surface 302 of the frame 300 and an edge of the inner surface 501 of the second cover 500, which will be explained in detail referring to FIGS. 4 to 6.

Figure 4:
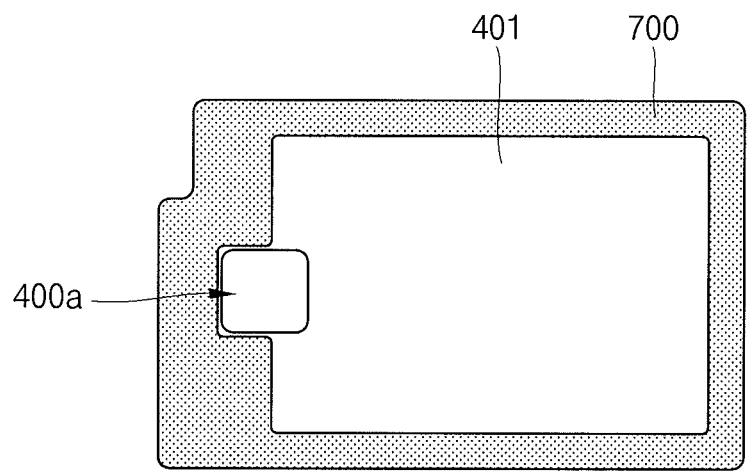
FIGS. 4 to 6 are partial views illustrating the card battery.
Figure 5:
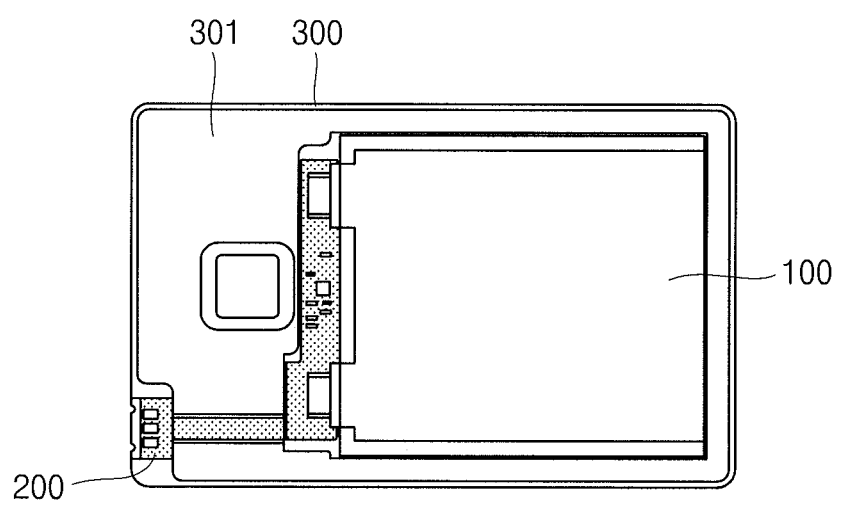
Figure 6:
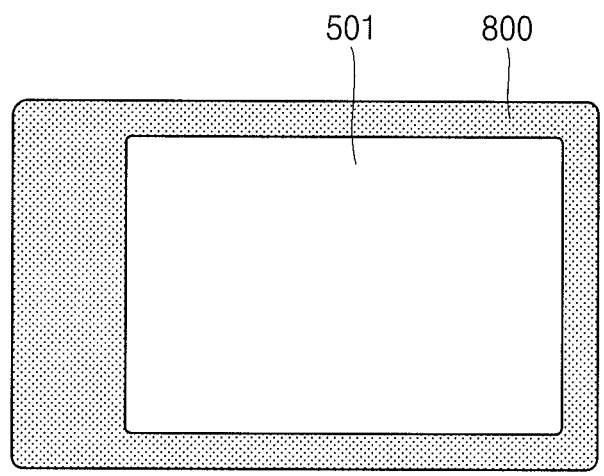

FIGS. 4 to 6 are partial views illustrating the card battery 10.

Referring to FIG. 1 and FIGS. 4 to 6, the first thermal bonding layer 700 is interposed between an edge of the first surface 301 of the frame 300 and an edge of the inner surface 401 of the first cover 400.

The first thermal bonding layer 700 is preliminarily attached to the edge of the inner surface 401 of the first cover 400 at a temperature of about 80° C. Then, the first cover 400 is attached to the frame 300 at a temperature of about 100 to 120° C. when the inner surface 401 of the first cover 400 is combined with the first surface 301 of the frame 300.

The first thermal bonding layer 700 may be formed by coating an adhesive such as polyester, polyamide, urethane and polyolefin on a base material such as polyethylene terephthalate, nylon, polyvinyl chloride and thermoplastic polyurethane.

As described above, the first cover 400 is combined with the bare cell 100 by the double-coated layer 610 interposed between the inner surface 401 of the first cover 400 and bare cell 100. However, in the structure combined only by the double-coated adhesive layer 610, bonding strength between the first cover 400 and bare cell 100 is weakened when the bare cell 100 is bent or twisted. Accordingly, the first cover 400 and bare cell 100 may be separated from each other.

Accordingly, the edge of the inner surface 401 of the first cover 400 may be strongly attached to the edge of the first surface of the frame 300 by the first thermal bonding layer 700. The first thermal bonding layer 700 has excellent adhesive strength compared than the double-coated adhesive layer 610. Therefore, the first thermal bonding layer 700 can prevent the first cover 400 from being separated from the frame 300 when the card battery 10 is bent or twisted. Accordingly, the first cover 400 and bare cell 100 can be strongly combined with each other.

In addition, the second thermal bonding layer 800 may be further provided between the edge of the inner surface 501 of the second cover 500 and the edge of the second surface 302 of the frame 300.

The second thermal bonding layer 800 is preliminarily attached to the edge of the inner surface 501 of the second cover 500 at a temperature of about 80° C. Then, the second cover 500 is attached to the frame 300 at a temperature of about 100 to 120° C. when the inner surface 501 of the second cover 500 is combined with the second surface 302 of the frame 300.

The second thermal bonding layer 800 may be formed by coating an adhesive such as polyester, polyamide, urethane and polyolefin on a base material such as polyethylene terephthalate, nylon, polyvinyl chloride and thermoplastic polyurethane.

As described above, the second cover 500 is combined with the bare cell 100 by the double-coated adhesive layer 620 interposed between the inner surface 501 of the second cover 500 and bare cell 100. However, in the structure combined only by the double-coated adhesive layer 620, bonding strength between the second cover 500 and bare cell 100 is weakened when the bare cell 100 is bent or twisted. Accordingly, the second cover 500 and bare cell 100 may be separated from each other.

Accordingly, the edge of the inner surface 501 of the second cover 500 may be strongly attached to the edge of the second surface 302 of the frame 300 by the second thermal bonding layer 800. The second thermal bonding layer 800 has excellent adhesive strength compared than the double-coated adhesive layer 620. Therefore, the second thermal bonding layer 800 can prevent the second cover 500 from being separated from the frame 300 when the card battery 10 is bent or twisted. Accordingly, the second cover 500 and bare cell 100 can be strongly combined with each other.

Referring to FIGS. 1 to 3, the first cover 400 is provided with a chip hole 400a to install an IC chip 900. The IC chip 900 is connected to the substrate 210 of the protection circuit module 200 through the chip hole. The protection circuit module 200 functions as a safety device to prevent ignition and explosion of the bare cell 100 and also functions as a main board to operate and process information with the IC chip 900.

The card provided with the IC chip 900 may be referred to as an IC card or smart card. The IC card has the same size as a general credit card and IC (Integrated circuit) memory. The IC card may further include a microprocessor, etc. The IC card has various intelligent functions in addition to information storage function. The IC card has a large storage capacity compared than a conventional magnetic card. The IC card can be used in most cards for various functions such as finance, traffic, ID card and security.

The card battery 10 can function as a smart card to store and process information and also function as a battery to supply power to an external electronic device. In the drawings, the IC chip 900 is shown to be provided on the first cover 400. However, the IC chip 900 may be provided on the second cover 500.

The thickness of the above described card battery 10 is 0.7 to 0.8 mm that is almost the same as a general credit card.

A magnetic strip 550 may be further provided on the second cover 500 separately from the IC chip 900. The magnetic strip 550 can also store information. However, the storage capacity of the magnetic strip 550 is very small compared than the IC chip 900. However, private information of a card owner can be separately stored in the magnetic strip 550 in addition to the IC chip 900.

A method of forming the magnetic strip 550 on the second cover 500 will be explained in detail below.

Figure 7:
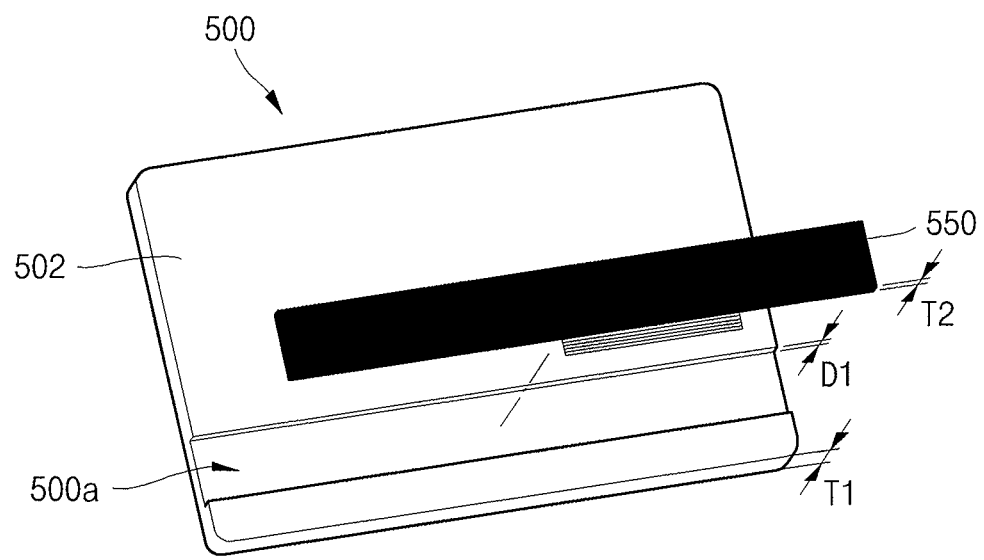
FIG. 7 is a rear view illustrating a card battery according to another exemplary embodiment of the present invention.

FIG. 7 is a rear view illustrating a card battery 10 according to another exemplary embodiment of the present invention.

Referring to FIG. 7, the card battery 10 further includes a magnetic strip 550 on an outer surface 502. The magnetic strip 550 is formed by coating magnetic material on plastic and storing desired information thereon.

A magnetic groove 500a having predetermined depth and width is formed from one short edge of the second cover 500 to the other short edge along a long edge thereof on the outer surface of the second cover 500.

The second cover 500 is formed of metal, more particularly, stainless steel. Accordingly, a groove having desired depth and width can be formed by various etching methods. A depth D1 of the magnetic groove 500a may be less than 50% of a thickness T1 of the second cover 500. When the depth D1 of the magnetic groove 500a is more than 50% of the thickness T1 of the second cover 500, a portion of the second cover 500 provided with the magnetic groove 500a becomes very thin. Accordingly, the portion of the magnetic groove 500a may be broken when external stress is applied thereto.

The magnetic strip 550 is provided in the magnetic groove 500a of the second cover 500. A thickness (T2) of the magnetic strip 550 is the same as the depth D1 of the magnetic groove 500a. Accordingly, the magnetic strip 550 is not projected out of the second cover 500.

Thus, installation space of the magnetic strip 550 in the card battery 10 is reduced, thereby allowing the card battery 10 to be slimmed.

The magnetic strip 550 may be formed also on the first cover 400. When the magnetic strip 550 is provided on the first cover 400, the structure and function thereof are the same as the case where the magnetic strip 550 is provided on the second cover 500.

Referring to FIGS. 1 to 3, the protection circuit module 200 may further include a terminal part (A) provided on the short edge of the card battery 10. The terminal part may include a portion of the substrate 210, the charging/discharging terminal 220 and the insulation layer 260 that are located on the short edge of the card battery 10. In addition, the terminal part may further include an openable terminal cover 270. The terminal part will be explained in detail below.

Figure 8:
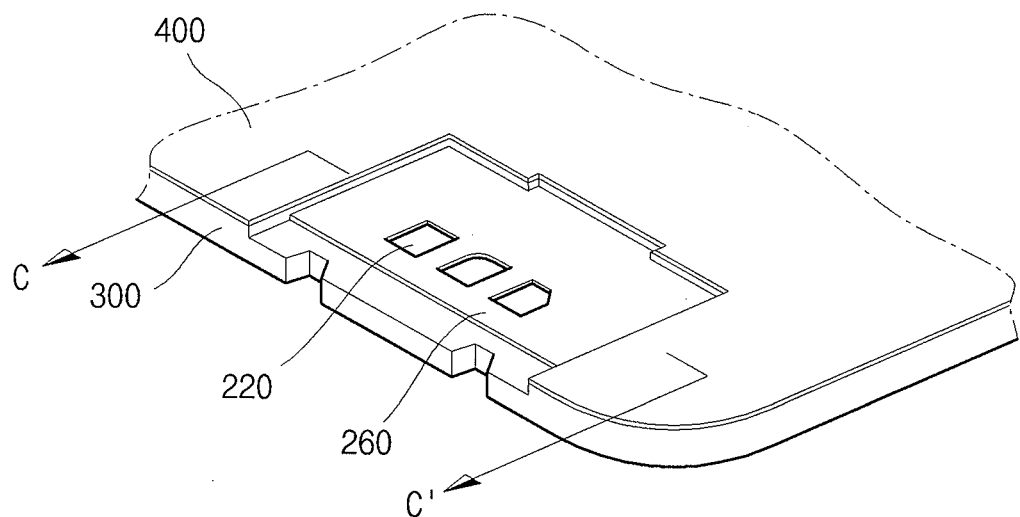
FIGS. 8 and 9 are respectively perspective and sectional views illustrating a terminal part of the card battery.
Figure 9:
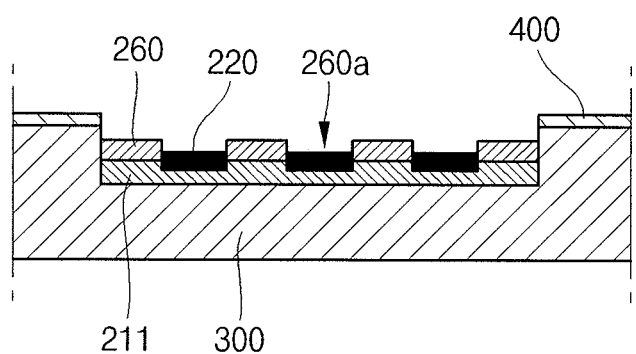

FIGS. 8 and 9 are respectively perspective and sectional views illustrating the terminal part.

Referring to FIGS. 8 and 9 with FIG. 1, the terminal part may further include a terminal substrate 211, a charging/discharging terminal 220 and an insulation layer 260 that are located on a short edge of the card battery 10. In addition, the terminal part may further include an openable terminal cover 270.

One side of the flexible printed circuit board, that is, the substrate 210 of the protection circuit module 200 is extended to the short edge of the frame 300. A rectangular portion of the board located at the short edge of the frame 300 is referred to as a terminal substrate 211 for convenience of explanation. The terminal substrate 211 is made of the same material as the substrate 210 of the protection circuit module 200 and merely means the substrate 210 located at the terminal part as described above.

The protection circuit module 200 is provided on the terminal substrate 211. The charging/discharging terminal 220 is electrically coupled to a conductive metal pattern provided on the terminal substrate 211. The protection circuit module 200 can supply power to an electronic device using the card battery 10 by being coupled thereto. A lower surface of the charging/discharging terminal 220 is provided on the terminal substrate 211, thereby allowing the entire thickness of the charging/discharging terminal 220 to be exposed to the outside. In addition, only an upper surface of the charging/discharging terminal 220 may be opened inside the terminal substrate 211, or only a portion of a side surface of the charging/discharging terminal 220 and an upper surface thereof may be opened according to design choice such as material, thickness and manufacturing process of the terminal substrate 211. In the embodiment, there will be explained the card battery 10 in which the portion of the side surface of the charging/discharging terminal 220 and the upper surface thereof are opened on the terminal substrate 211.

The upper surface of the charging/discharging terminal 220 is formed to be lower than the upper surface of the first cover 400. The charging/discharging terminal 220 is formed to be lower than the first cover, thereby preventing the charging/discharging terminal 220 from being shorted by undesired contact with external metals. When the upper or side surface of the charging/discharging terminal 220 is formed to be opened on the terminal substrate 211, the charging/discharging terminal 220 may be contacted to external metals in addition to the electronic device. This may cause a short. Accordingly, durability degradation, ignition and explosion of the battery may be caused. Therefore, short of the card battery 10 can be significantly prevented by reducing probability of contact between the charging/discharging terminal 220 and external metals through forming the charging/discharging terminal 220 to be lower than the first cover 400.

In addition, the insulation layer 260 may be provided around the charging/discharging terminal 220. More particularly, the insulation layer 260 is provided to surround the side surface of the charging/discharging terminal 220. A terminal hole 260a may be formed at a position corresponding to the upper surface of the charging/discharging terminal 220. The charging/discharging terminal 220 may be located in the terminal hole 260a. The insulation layer 260 may be attached to the terminal substrate 211 with a step difference higher than the charging/discharging terminal 220.

The step difference of the insulation layer 260 is higher than the charging/discharging terminal 220, thereby better preventing the charging/discharging terminal 220 from being shorted by undesired contact with external metals.

In other words, the insulation layer 260 is contacted on the terminal substrate 211 with the step difference higher than the charging/discharging terminal 220. Then, even if the charging/discharging terminal 220 is contacted to the external metal, the metal is contacted to the insulation layer 260 instead of the charging/discharging terminal 220. Thus, possibility of short of the card battery 10 is significantly reduced.

A terminal cover 270 may be further provided on the insulation layer 260. The terminal cover 270 protects the charging/discharging terminal 220 with the insulation layer 260. The terminal cover 270 can be opened or closed. Thus, the terminal cover 270 may be opened when the terminal part is connected to the electronic device. Or, the terminal cover 270 may be closed when the user carries the card battery 10 or uses it as a card.

As described above, the card battery of the present invention produces the following effects.

First, the card battery can function as both of the smart card and battery.

Second, the card battery can prevent short caused by contact with an external device.

Third, a total thickness of the card battery is reduced.

Fourth, bonding strength between internal elements is enhanced.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A card battery having a smart card function, comprising:
a battery cell, wherein the battery cell is a bare cell comprising first and second electrode tabs, an electrode assembly, and a pouch surrounding the electrode assembly;
a protection circuit module comprising first and second lead plates respectively electrically coupled to the first and second electrode tabs of the battery cell;
a frame receiving the battery cell and protection circuit module;
a first cover provided on the frame;
a second cover provided under the frame; and
an IC chip is provided on the first or second cover and connected to the protection circuit module,
wherein the protection circuit module comprises:
a substrate;
a protection circuit unit provided on the substrate; and
a charging/discharging terminal that is provided on the substrate and electrically coupled to the protection circuit unit,
wherein an upper surface of the charging/discharging terminal is lower than an upper surface of the first cover,
wherein the protection circuit module operates and processes information with the IC chip,
wherein the protection circuit module further comprises an insulation layer provided on the substrate and abuts the side surface of the charging/discharging terminal,
wherein the upper surface of the charging/discharging terminal is lower than an upper surface of the insulation layer,
wherein the protection circuit module comprises a terminal cover configured to be opened when the charging/discharging terminal is connected to an electronic device,
wherein the electrode assembly comprises:
a first electrode plate;
a second electrode plate; and
a separator, and
wherein the electrode assembly is formed by interposing the separator between the first and second electrode plates and winding them together in a jelly-roll type.

2. The card battery of claim 1, wherein the substrate is formed of a flexible printed circuit board (FPCB).

3. The card battery of claim 1, wherein a magnetic strip is provided on the first or second cover, wherein the magnetic strip is configured to store information.

4. The card battery of claim 1, wherein a double-coated adhesive layer is provided between the battery cell and the first cover, and between the battery cell and the second cover respectively.

5. The card battery of claim 1, wherein a terminal hole is formed at a position corresponding to the upper surface of the charging/discharging terminal.

6. A card battery having a smart card function, comprising:
a battery cell, wherein the battery cell is a bare cell comprising an electrode assembly and a pouch surrounding the electrode assembly;
a protection circuit module electrically coupled to the battery cell;
a frame receiving the battery cell and protection circuit module;
a first cover, provided on the frame, being made of metal;
a second cover, provided under the frame, being made of metal; and
an IC chip is provided on the first or second cover and connected to the protection circuit module,
wherein a groove is formed on an outer surface of the first or second cover in a direction of a long edge of the cover,
wherein the protection circuit module operates and processes information with the IC chip,
wherein a magnetic strip is seated in the groove,
wherein the protection circuit module comprises:
a substrate;
an insulation layer;
a charging/discharging terminal; and
a terminal cover configured to be opened when the charging/discharging terminal is connected to an electronic device,
wherein the upper surface of the charging/discharging terminal is lower than an upper surface of the insulation layer,
wherein the electrode assembly comprises:
a first electrode plate;
a second electrode plate; and
a separator, and
wherein the electrode assembly is formed by interposing the separator between the first and second electrode plates and winding them together in a jelly-roll type.

7. The card battery of claim 6, wherein the first or second cover is formed of stainless steel.

8. The card battery of claim 6, wherein the depth of the groove is the same as a thickness of the magnetic strip.

9. The card battery of claim 6, wherein the protection circuit module further comprises:
a protection circuit unit provided on the substrate;
the charging/discharging terminal, provided on the substrate, being located at one side of the card battery;

a first lead plate, provided on the substrate, being electrically coupled to the first tab of the battery cell; and a second lead plate, provided on the substrate, being electrically coupled to the second tab of the battery cell.

10. The card battery of claim 9, wherein the substrate is formed of a flexible printed circuit board.

11. A card battery having a smart card function, comprising:

a battery cell, wherein the battery cell is a bare cell comprising an electrode assembly and a pouch surrounding the electrode assembly;

a protection circuit module electrically coupled to the battery cell;

a frame receiving the battery cell and protection circuit module;

a first cover provided on the frame;

a second cover provided under the frame;

a first thermal bonding layer provided between an edge of an inner surface of the first cover and an edge of a first surface of the frame; and an IC chip is provided on the first or second cover and connected to the protection circuit module, wherein the protection circuit module operates and processes information with the IC chip, wherein the protection circuit module comprises:

a substrate;

an insulation layer;

a charging/discharging terminal; and a terminal cover configured to be opened when the charging/discharging terminal is connected to an electronic device, wherein the upper surface of the charging/discharging terminal is lower than an upper surface of the insulation layer, wherein the electrode assembly comprises:

a first electrode plate;

a second electrode plate; and a separator, and wherein the electrode assembly is formed by interposing the separator between the first and second electrode plates and winding them together in a jelly-roll type.

12. The card battery of claim 11, further comprising a second thermal bonding layer provided between an edge of an inner surface of the second cover and an edge of a second surface of the frame.

13. The card battery of claim 11, wherein a double-coated adhesive layer is provided between the battery cell and the first cover, and between the battery cell and the second cover respectively.

14. The card battery of claim 11, wherein the protection circuit module further comprises:

a protection circuit unit provided on the substrate;

the charging/discharging terminal, provided on the substrate, being located at one side of the card battery;

a first lead plate, provided on the substrate, being electrically coupled to the first tab of the battery cell; and a second lead plate, provided on the substrate, being electrically coupled to the second tab of the battery cell.

* * * * *